United States Patent
Strack

(10) Patent No.: US 10,622,793 B2
(45) Date of Patent: Apr. 14, 2020

(54) ENERGY CHAIN COMPRISING A HOLDER FOR AN EXTERNAL CABLE, RECEIVING ELEMENT AND CORRESPONDING SIDE PLATE

(71) Applicant: igus GmbH, Cologne (DE)

(72) Inventor: Stefan Strack, Koenigswinter (DE)

(73) Assignee: IGUS GMBH, Cologne (DE)

( * ) Notice: Subject to any disclaimer, the term of this patent is extended or adjusted under 35 U.S.C. 154(b) by 82 days.

(21) Appl. No.: 15/558,827

(22) PCT Filed: Mar. 16, 2016

(86) PCT No.: PCT/EP2016/055722
§ 371 (c)(1),
(2) Date: Oct. 6, 2017

(87) PCT Pub. No.: WO2016/146706
PCT Pub. Date: Sep. 22, 2016

(65) Prior Publication Data
US 2018/0109091 A1    Apr. 19, 2018

(30) Foreign Application Priority Data
Mar. 16, 2015 (DE) .................... 20 2015 101 341 U

(51) Int. Cl.
*F16G 13/16* (2006.01)
*H02G 3/04* (2006.01)
*H02G 11/00* (2006.01)

(52) U.S. Cl.
CPC .......... *H02G 3/0475* (2013.01); *F16G 13/16* (2013.01); *H02G 11/00* (2013.01)

(58) Field of Classification Search
CPC ....... F16G 13/16; H02G 11/00; H02G 3/0475
(Continued)

(56) References Cited

U.S. PATENT DOCUMENTS 5,829,243 A    11/1998 Hughes
6,349,534 B1    2/2002 Zanolla et al.
(Continued)

FOREIGN PATENT DOCUMENTS

DE    2437742    2/1976
DE    10115566    12/2002
(Continued)

OTHER PUBLICATIONS

English translation of the International Preliminary Report on Patentability from corresponding PCT Application No. PCT/EP2016/055772 dated Sep. 21, 2017.
(Continued)

*Primary Examiner* — David B Jones
(74) *Attorney, Agent, or Firm* — Grossman, Tucker, Perreault & Pfleger, PLLC

(57) ABSTRACT

An energy chain for cables, which chain comprises chain links, of which at least a section of said chain links has side plates that are parallel to one another and has transverse connecting pieces that connect the side plates, wherein the majority of the guided cables run inside the chain links in a longitudinal direction, while at least one further cable is arranged outside the chain links and is supported by holding elements provided on the energy chain. Receptacles are attached on one side of the energy chain on the outer surfaces of at least some of the side plates in the region between each pair of pivot axes, in which receptacles the holding elements for the at least one further cable can be inserted along a plane that runs parallel to the side plates.

17 Claims, 8 Drawing Sheets

(58) Field of Classification Search
USPC .................................... 59/78.1; 248/49, 51
See application file for complete search history.

(56) References Cited

U.S. PATENT DOCUMENTS

| | | |
|---|---|---|
| 6,773,297 B2 | 8/2004 | Komiya |
| 6,945,027 B2 * | 9/2005 | Blase ..................... F16G 13/16 248/49 |
| 2008/0280717 A1 | 11/2008 | Wehler |
| 2013/0020290 A1 * | 1/2013 | Epperlein ............... F16G 13/16 219/121.6 |

FOREIGN PATENT DOCUMENTS

| | | |
|---|---|---|
| DE | 102004022512 | 12/2005 |
| DE | 60204937 | 4/2006 |
| DE | 102008046701 | 3/2010 |
| DE | 102010003282 | 9/2011 |
| JP | 2001-012560 | 1/2001 |
| WO | 2007/109510 | 9/2007 |

OTHER PUBLICATIONS

English translation of International Search Report dated Jul. 1, 2016.

\* cited by examiner

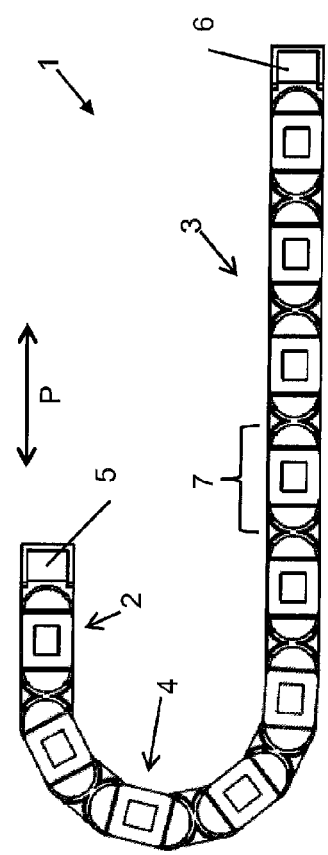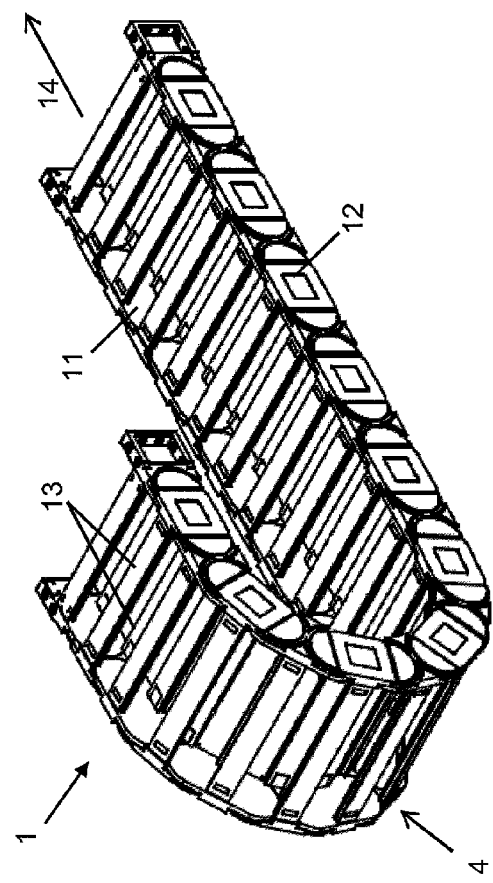
FIG. 1
FIG. 2

D-D (1:1)

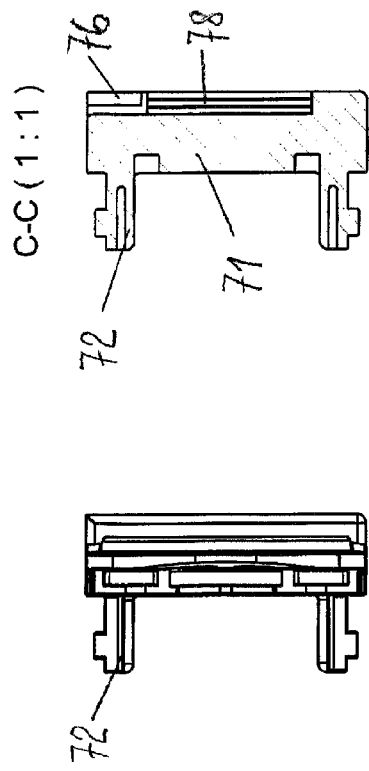
FIG. 7A
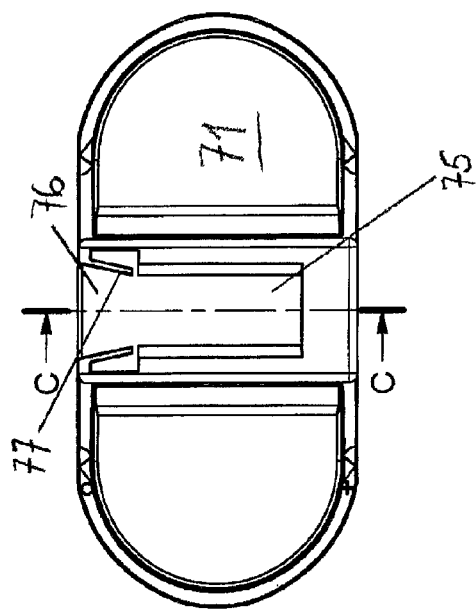
FIG. 7D
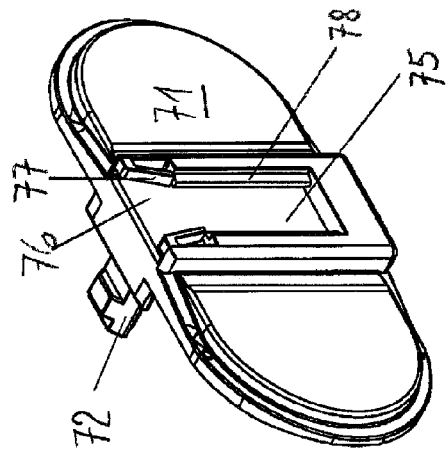
FIG. 7C
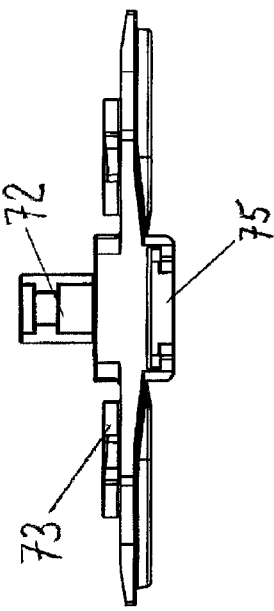
FIG. 7E
FIG. 7B

ENERGY CHAIN COMPRISING A HOLDER FOR AN EXTERNAL CABLE, RECEIVING ELEMENT AND CORRESPONDING SIDE PLATE

FIELD

The invention concerns an energy guiding chain for guiding lines like cables, hoses and the like comprising a plurality of hingedly interconnected chain links formed by mutually parallel side plates and transverse limbs connecting same. In particular the invention concerns such an energy guiding chain in which, besides the lines extending in the longitudinal direction within the chain links formed from side plates and transverse limbs, at least one further line is also present and guided outside the chain links.

BACKGROUND

Such energy guiding chains are used for example in installations in which a moveable part of the installation has to be supplied from a stationary region with energy and/or fluid materials, for example for consumption or for fluid-mechanical control. That is generally effected by a plurality of lines which extend parallel and which are laid in the longitudinal passage formed by the chain links. Maintenance, repair and/or replacement of such a line generally requires the chain links to be opened, involving a corresponding effort and expenditure. If when setting up the installation it is to be predicted that, in regard to a given line, such operations may occur more frequently or if a line is added upon modifications to the installation, that line can be fitted to the outside of the chain and is thus more easily accessible.

A chain link of that kind is described in DE 10 2010 003 282 A1, which includes a plurality of holding elements which occur in succession in the longitudinal direction of the chain and by means of which a line can additionally be fixed outside the chain. Those holding elements are preferably mounted rotatably, in which case their axis of rotation coincides with a respective pivot axis between adjacent links, and they can preferably be fixed to the energy guiding chain with a preferably releasable push-in connection. In that case existing holding elements can also be replaced by others.

In the case of such a chain, the rotatable fixing of the holding elements in the pivot axis means that the forces acting upon displacement of the chain heavily load the overlap region of the side plate, that is thinner in relation to the central region, or the pivot pin provided with a bore for receiving the holding element, so that material fatigue or breakage can occur. In addition it may be difficult to pull the holding element out in the direction of the pivot axis if the energy guiding chain is being used in constricted spatial conditions.

A so-called "latching clip" is also known from igus GmbH, Cologne (Germany), in which a line can be fixed on a main body in the form of a side plate, by means of a band forming a loop.

Laid-open application JP 2001-012560 A discloses a connecting component in the manner of a clip connector which serves for bundling a plurality of energy guiding chains. It fixes two mutually juxtaposed energy guiding chains in parallel relationship to each other by latching connections.

Taking that state of the art as the basic starting point, the object of the invention is to provide an energy guiding chain with which it is possible for a line guided outside the chain links to be easily fitted and removed again, wherein the stability of the chain is to be maintained.

SUMMARY

That object is attained by an energy guiding chain and independently thereof by a receiving element for an energy guiding chain.

The energy guiding chain according to the invention has a plurality of hingedly interconnected chain links which have mutually parallel side plates which are optionally connected by transverse limbs, wherein adjacent chain links are pivotable relative to each other about a respective pivot axis extending transversely relative to the longitudinal direction of the chain. In that arrangement the plurality of the lines guided by the chain extends within the chain links while at least one further line is arranged outside the chain links and is supported by holding elements provided on the energy guiding chain.

According to the invention receiving means are provided on at least one side of the energy guiding chain on the outside surfaces of the side plates, in particular in the region between two respective pivot axes. The receiving means are such that a respective holding element for the at least one further line can be inserted into each receiving means along a plane extending substantially parallel or technically parallel to the side plate.

The locational adverbs within and outside refer in the present case to the receiving space, considered in cross-section, of the energy guiding chain, which space is delimited by the side plates and the transverse limbs. In that respect, in a so-called half-limb energy guiding chain, transverse limbs are provided only at each second chain link, while in a so-called full-limb energy guiding chain each chain link is respectively formed by side plates and transverse limbs.

In the case of the present invention however the structure of the chain links as such is not the important consideration. In the energy guiding chain according to the invention for example identical chain links can be connected together, having so-called cranked side plates, or also chain links which include alternately internal and external plates. In the latter case it may be sufficient for the receiving means to be provided only at the external plates or only at the internal plates.

The chain links can be provided with additional devices as are known from the state of the art, for example separation limbs which subdivide the internal space in the chain links, devices which facilitate opening the chain links and means which facilitate displacement of the upper run of the chain on the lower run, like rollers or slide elements.

The at least one line arranged outside the chain links can be mounted on each of the two outsides of the energy guiding chain. It is also possible for lines to be mounted on both outsides. Equally two or some lines can also extend on one side, such lines being supported by common holding elements. In general the number of the lines arranged within the chain links is greater than that of the lines extending at the outsides.

The lines guided by the energy guiding chain according to the invention can transport for example energy, for example electricity, light radiation, or inherent energy of compressed fluids like compressed air or hydraulic fluids or materials for consumption like natural gas, mineral oil, chemical reagents, between two connecting locations which are moveable relative to each other. Depending on that respective purpose of use, the lines include for example conductors with metal wires, hoses or flexible tubes of suitable materials.

The holding elements can have for example a foot portion which can be inserted into the receiving means, and a further portion having an opening through which the line can be guided. That opening can be afforded for example by a ring which optionally can be opened for insertion or removal of the line. Suitable holding elements are commercially available for other applications and can be used according to the invention, for example those known by the term System holder from PMA, AG, Uster (Switzerland).

In a preferred embodiment the receiving means are integral with the respective side plates, that is to say the receiving means is formed at the outside of the side plates.

Another particularly preferred embodiment is characterised in that the receiving means are provided in a receiving element which can be fixed to the outsides of the side plates. This embodiment has the advantage that not only can the externally extending line be easily removed for the purposes of maintenance or repair, but also it is easily possible to fit an additional line which was not yet provided in the course of manufacture of the energy guiding chain.

The receiving element can preferably be fixed to the outside of the side plates with elastically deformable latching hooks. Those latching hooks can embrace the upper and lower narrow sides of the side plates and bear against the insides of the side plates. Such latching hooks can be provided at the ends of a respective region which is at the upper and lower ends of the receiving element and which is preferably angled through 90° and which in turn can bear against the narrow side of the side plates. Preferably two upper and two lower latching hooks are provided on the respective receiving element. The spacing of two respective latching hooks can be such that they bear against the transverse limb fitted at the inside of the side plate, whereby displacement of the receiving element in the longitudinal direction of the energy guiding chain is prevented. The latching hooks can be bevelled at their ends, whereby fitting the receiving element on to the side plates is made easier.

At least one further latching projection can be provided centrally on each angled region, which latching projection can latchingly engage into a recess which is present in any case in the narrow side of the side plate and can reinforce the connection of the receiving element to the side plate and in particular can prevent longitudinal displacement of the receiving element on the side plate.

Preferably the receiving means are in the form of rectangular recesses in the side plates or the receiving elements, wherein those recesses are oriented with their longer side transversely relative to the energy guiding chain and are open in that direction towards one side. The portion of the holding element, that can be inserted into the receiving means, can be introduced at that open side.

The inside surfaces of the longitudinal sides of the recesses, that extend transversely relative to the energy guiding chain, are preferably profiled so that they can fix a holding element introduced into the recess with a corresponding counterpart profile in a direction perpendicular to the side plates. Such profiles can be for example a tongue-and-groove connection or a dovetail connection. It will be appreciated that it is also possible for the holding element to be fixed in the recess with other means, instead of being fixed by means of a continuous groove, for example by a projection protruding at the inside edge or the like.

Preferably there is provided at the open side of the receiving means an insertion funnel configuration, that is to say an enlargement, preferably with inclined surfaces, which can facilitate insertion of the holding element. At least one latching spring can be provided at the sides of that insertion funnel configuration, which elastically deflects upon insertion of the holding element and thereafter is relieved of stress, and can move back into the initial position and can prevent the holding element from falling out of the recess.

The line extending outside the chain links can be supported directly by the holding element. It is however also advantageous for one or in particular some lines to be received in a flexible tube which then is in turn supported by the holding elements. The flexible tube can be a corrugated tube, for example of plastic, or it can also be a correspondingly flexible, elastic and stable hose, for example a corrugated hose with a spiral reinforcement.

The holding elements can also be effectively prevented from falling out of the receiving means if the receiving means are arranged in such a way that their openings are directed upwardly and downwardly alternately in the longitudinal configuration of the chain. That can be achieved upon assembly of the energy guiding chain, insofar as the side plates provided with the receiving means are fitted in a suitable orientation. That is achieved in a even easier fashion with the receiving elements which can be subsequently fitted in place.

Preferably receiving elements which can be subsequently fitted in place are provided at only one side, that is to say at precisely one side of the energy guiding chain. In many uses only one additional line is required, which is to be quickly replaceable.

A further aspect of the invention concerns a receiving element as an add-on part for an energy guiding chain. In accordance with this aspect it has a rectangular recess which is oriented with its longer side transversely relative to the energy guiding chain and is open in that direction towards one side, wherein the receiving element at at least one of the narrow sides transversely relative to the longer sides has elastically deformable latching hooks which can embrace the upper and lower narrow sides of the side plates. Preferably the latching hooks bear against surfaces of the insides of the side plates of the chain link.

According to the invention the receiving element is suitable for quick and easy fixing and removal of additional parts, in particular holding elements for at least one additional line which is to be guided outside the chain links.

Preferably, in this receiving element, the inside surfaces of the longitudinal sides of the recess are profiled in such a way that a holding element or additional part fitted into the recess, having a corresponding counterpart profile, is fixed in a direction perpendicularly to the side plate.

Advantageously at the open side of the recess the receiving element includes an enlarged insertion funnel configuration which makes it easier to insert the holding element into the recess. Particularly advantageously there is at least one latching spring which is provided at the insertion funnel configuration and which can prevent the inserted holding element from falling out of the recess.

It is advantageous in regard to the energy guiding chain according to the invention inter alia that conventional, commercially available holding elements can be used.

In addition removal and installation of the line guided on the chain at the outside thereof for maintenance, repair or replacement is substantially easier than in the state of the art. For example it is possible to prepare the line by providing it with holding elements. The line which is prepared in that way can be substituted for the installed line by simply removing or inserting the holding elements in the receiving means of the receiving elements or side plates, and that is possible with the shortest stoppage time. If, instead of the line, a corrugated tube is fitted into the holding elements, which in turn receives the line, the holding elements cannot be displaced on the corrugated tube, and that further facilitates installation.

Because the holding elements are removed from or fitted into the receiving means in a direction substantially parallel to the side plates and not away therefrom, fitment and removal is easily possible, even in constricted space conditions.

A further advantage of the structure according to the invention is that the holding forces engage the stronger regions of the side plates between the pivotal mountings thereof, and therefore those mountings are subjected to less severe loadings, so that the risk of wear or abrasion wear and breakage is lower.

A third independent aspect of the invention concerns a side plate for an energy guiding chain which has a receiving means according to the invention for a holding element. In this case the side plate and in particular the receiving means can have one or more of the above-indicated features.

In a further development provided in the receiving means or recess is a centring projection which centringly cooperates with a through bore in a foot portion of the holding element so that a corresponding holding element, irrespective of its structure size, always engages approximately centrally at the level of the neutral fibre of the energy guiding chain.

BRIEF DESCRIPTION OF THE DRAWINGS

Further features and advantages of the invention are described more fully hereinafter without limitation on the generality of the foregoing description with reference to the accompanying drawings in which:

FIG. 1 shows an energy guiding chain according to the state of the art;

FIG. 2 shows a portion from an energy guiding chain according to the state of the art;

FIGS. 7A-7E show a side plate with receiving means shaped thereon according to a third embodiment of the invention;

DETAILED DESCRIPTION

Figure 3C:
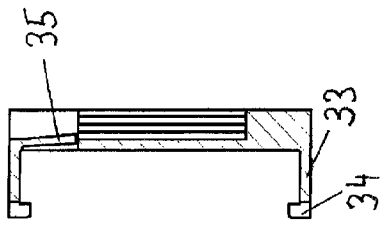
FIGS. 3A-3E show a receiving element according to a first embodiment by way of example of the invention.
Figure 3B:
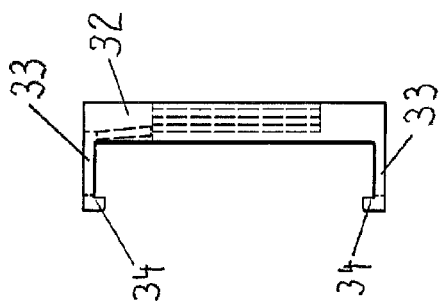
Figure 3A:
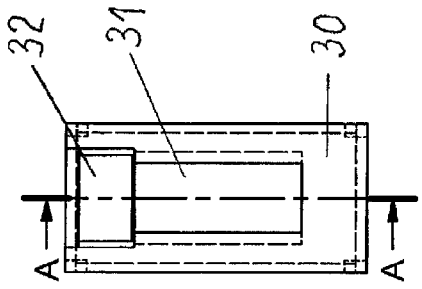
Figure 3E:
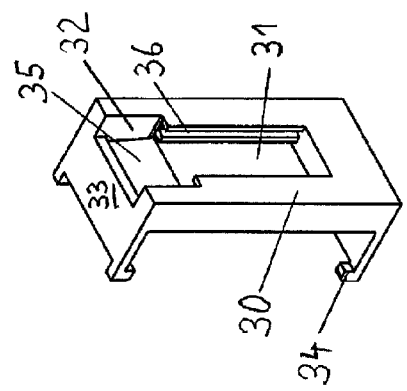
Figure 3D:
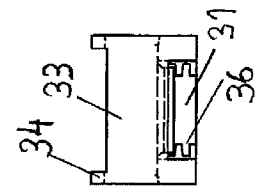
Figure 4C:
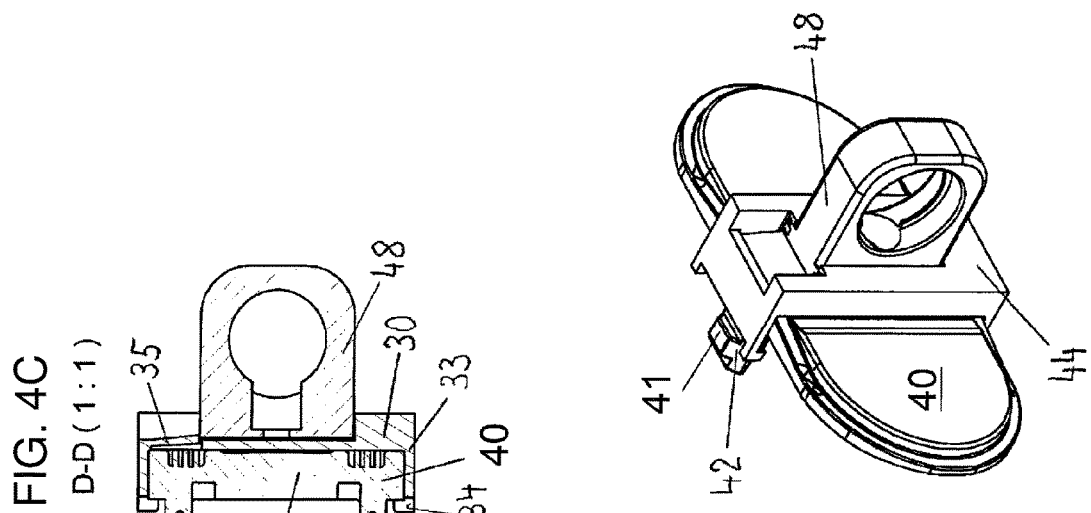
FIGS. 4A-4D show an external plate with fitted receiving element.
Figure 4D:
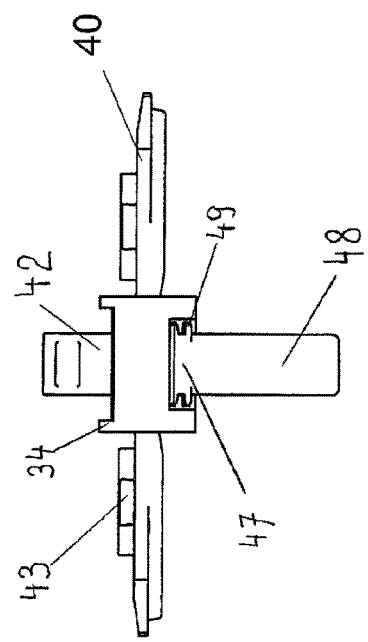
Figure 4A:
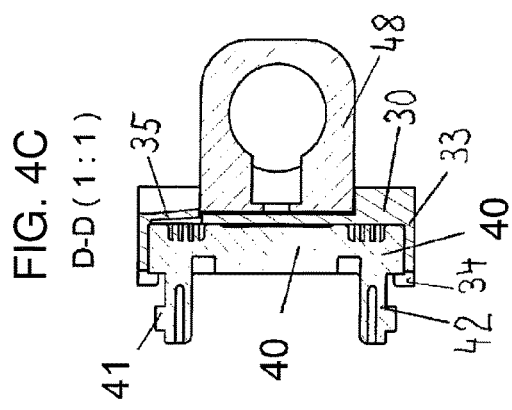
Figure 4B:
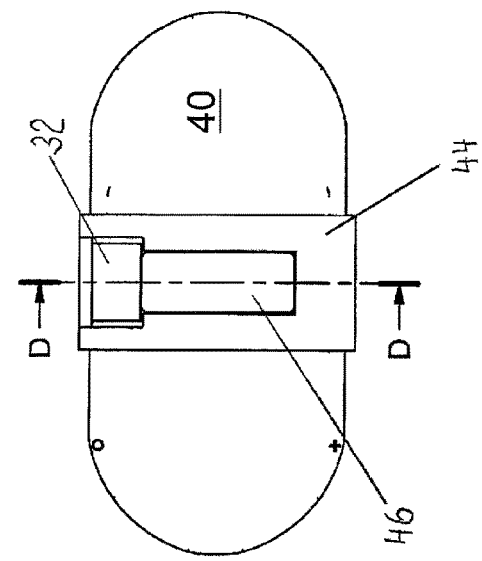
Figure 5C:
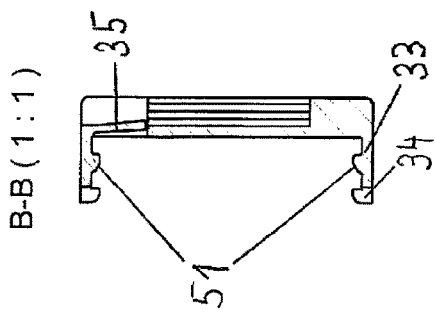
FIGS. 5A-5E show a receiving element according to a second embodiment by way of example of the invention.
Figure 5E:
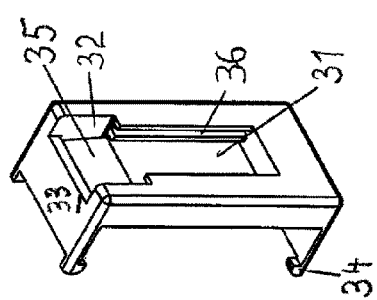
Figure 5B:
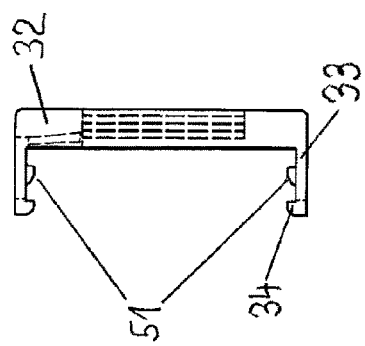
Figure 5A:
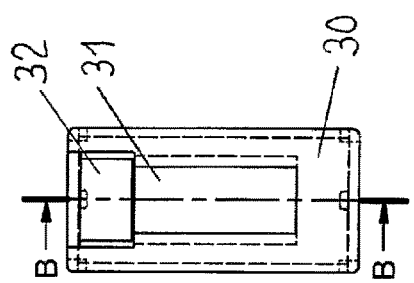
Figure 5D:
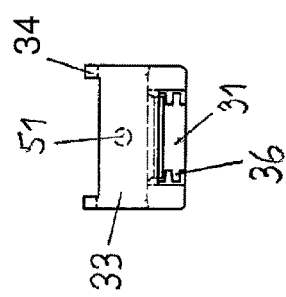
Figure 6A:
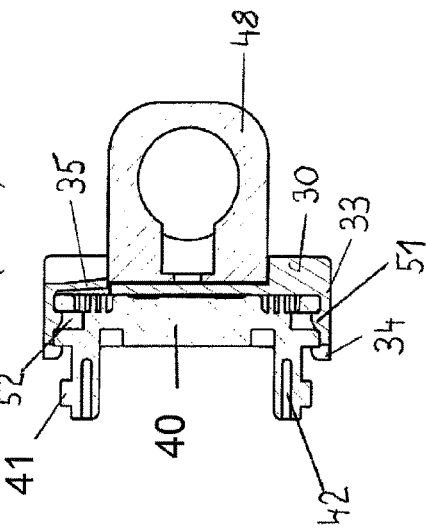
FIGS. 6A-6D show a side plate with the receiving element of FIG. 5.
Figure 6C:
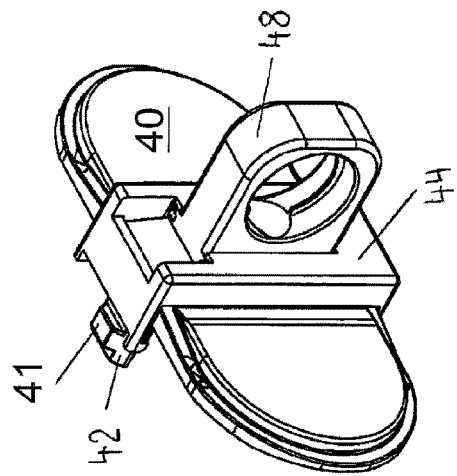
Figure 6B:
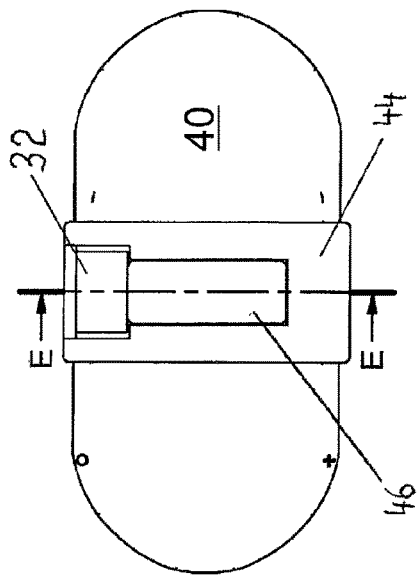
Figure 6D:
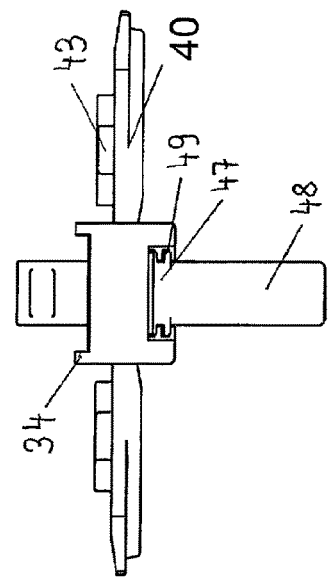
Figure 8D:
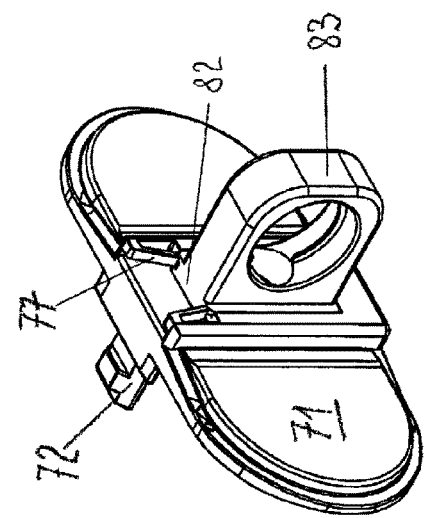
FIGS. 8A-8D show the side plate of FIG. 7 with inserted holding element.
Figure 8C:
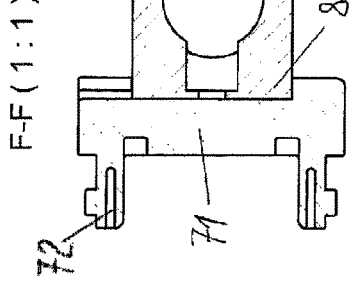
Figure 8A:
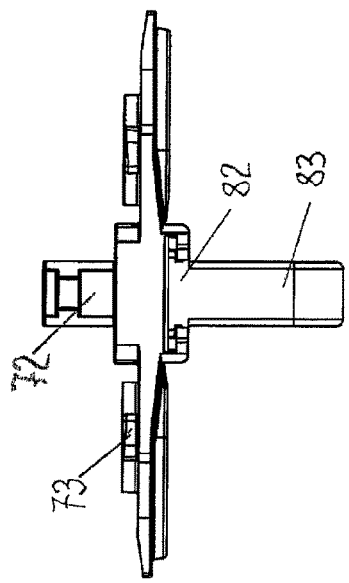
Figure 8B:
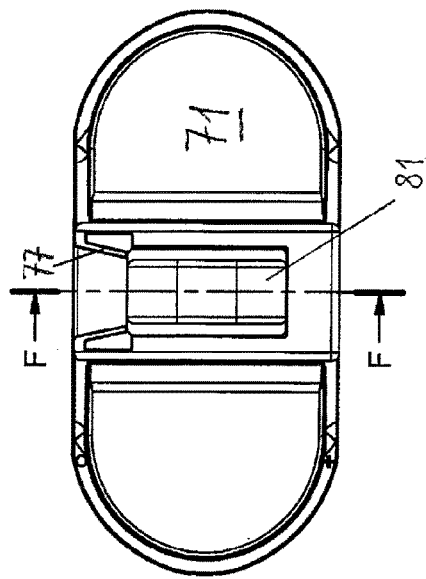

The known energy guiding chain 1 diagrammatically shown in FIG. 1 connects a fixed connecting location (not shown in greater detail) at a first end fixing portion 5 to a moveable connecting location (not shown in greater detail) at a second end fixing portion 6, for example for providing a supply with electric current, electrical control signals and compressed air. The moveable connecting location is displaceable in the directions of the double-headed arrow P. In the illustrated structure the energy guiding chain 1 is of such a design that the upper run 2 of the chain is self-supporting, that is to say it does not slide on the lower run 3. The individual chain links 7 are pivotably connected together. In the movement of the connecting location 6 for example towards the right chain links of the upper run 2 pass into the direction-changing region 4 and thereafter into the lower run 3 and are for example set down with same. A corresponding situation occurs in the movement towards the left. Vertical installation of the chain is also possible.

FIG. 2 shows a portion from an energy guiding chain according to the state of the art. It is possible to see external side plates 2 which are connected by transverse limbs 13 and respectively form a chain link. Disposed alternately between the chain links which are such a configuration are further chain links which include internal plates 11 and similar transverse limbs 13. The lines to be guided extend in the direction of the arrow 14 in the internal space formed in the energy guiding chain by the chain links. Each plate is connected pivotably to its adjacent plate.

FIG. 3 shows a first embodiment of a receiving element according to the invention for fitment to the outside of a side plate, more specifically a) as a front view, b) as a side view, c) as a section along A-A in a), d) a plan view and e) an isometric view. This embodiment includes a cuboidal body 30 in which there is a recess 31. That recess is open at the upper end, wherein a somewhat enlarged insertion funnel configuration 32 is intended to facilitate insertion of the holding element into the recess. The latching spring 35 extends in this case over the width of the recess 31. Upon insertion of the holding element the spring 35 is elastically bent back and after the holding element has passed it, it springs back into its starting position and thus prevents the holding element from falling out. Provided at the inner longitudinal side of the recess is a groove 36 which receives a corresponding tongue on the holding element, whereby the latter is fixed in the recess and cannot fall out forwardly. Provided at the upper and lower ends of the body 30 is a respective region 33 which is angled through 90° and which, upon being mounted to the side plate, can bear against the narrow sides of the plate. The angled regions are of such dimensions that when the receiving element is fitted in place, they can be bent elastically upwardly and downwardly respectively, whereby the latching projections 34 at their ends slide over the narrow sides of the side plates and after the return movement of the angled regions can bear against the insides of the side plates.

FIG. 4 shows an external side plate of an energy guiding chain according to the invention, more specifically a) as a front view, b) as a plan view, c) as a section D-D in a) and d) as an isometric view. The side plates 40 each have a respective body 40 which is provided with a pin 42 for receiving a transverse limb and with pivot sleeves 43 which can receive the corresponding pivot pins of the adjacent plates. In this case the transverse limbs can be fitted on to the pins 42 and latched with the latching projection 41. Fitted to the side plate 40 is a receiving element 44 as shown in FIG. 3, for the details of which the reference numerals used there can be employed here. The receiving element 44 lies with its body 30 against the front side of the side plate 40 and with both angled regions 33 against the narrow side of the side plates 40, wherein the latching projections 34 bear against the inside of the side plates 40. It can be seen from the plan view b) that, when a transverse limb (not shown here) is fitted on to the pin 42, the latching projections 34 bear against the transverse limb and can prevent longitudinal displacement of the receiving element on the side plate. Inserted into the receiving means of the receiving element 44 is a holding element 46, the details of which can be seen in the plan view b) and in the section view c). It has a foot portion 47 and a ring portion 48. Tongues 49 engage into the grooves 36 (FIG. 3) at the inner longitudinal walls of the recess of the receiving element and prevent it from falling out forwardly. Arranged in the enlarged insertion funnel configuration 32 of the receiving element 44 is the latching spring 35 which, as can be seen from the section view c), prevents the holding element from falling out upwardly.

FIG. 5 shows another embodiment of the receiving element according to the invention, once again a) as a front view, b) as a side view, c) as a section B-B as shown in Figure a), d) as a plan view and e) as an isometric view. The embodiment corresponds in several features to the structure shown in FIG. 3; therefore identical reference numerals are used for the same features. Once again provided in the body 30 of the receiving element is a recess 31 having an insertion funnel configuration 32. The angled regions 33 with the latching projections 34 and the latching spring 35 and the grooves 36 also correspond to the above-indicated embodiment. In addition to that embodiment however the receiving element shown in FIG. 5 is respectively provided with an additional latching projection 51 in the centre of the angled region, which can latchingly engage into an opening in the narrow side of the side plate and still further improves fixing of the receiving element to the side plate.

FIG. 6 shows a side plate of a second embodiment of the energy guiding chain according to the invention, using the receiving element shown in FIG. 5. Insofar as features having the same action as in the first embodiment are present here the same reference numerals are employed. Once again the side plate 40 is provided with a pin 42 having the latching projection 41 for fitting on and latching a transverse limb and pivot sleeves 43. Fitted into the receiving element 44 is the holding element 46 which is again prevented from falling out upwardly by the latching spring 35 and from falling out forwardly by the tongue-and-groove connection 49. In addition this embodiment has a further latching projection 51 which is provided centrally on each angled region 33 of the receiving element 44 and which engages into a recess 52 in the side surface of the side plate 40. That additionally provides for fixing of the receiving element in the longitudinal direction of the energy guiding chain. That is of significance in particular when the latching projection 34 does not bear against the transverse limb without play, as described above.

FIG. 7 shows a side plate for a third embodiment of the energy guiding chain according to the invention, more specifically a) as a front view, b) as a side view, c) as a section C-C as shown in Figure a), d) as a plan view and e) as an isometric view. In this embodiment the receiving means for the holding element is not provided in a receiving element which can be fitted on, but is shaped integrally on the side plate. As in the other embodiments the side plate here also includes a body 71 and a pin 72 with a latching projection for transverse limbs (not shown) and pivot sleeves 73 for receiving the pivot pins of the adjacent side plates. Provided in the region between the pivot axes in the external wall (emphasised here) of the side plate is a forwardly and upwardly open recess 75 having an enlarged insertion funnel configuration 76 upwardly thereof. Two latching springs 77 for fixing an inserted holding element are provided in this case at the narrow sides of the insertion funnel configuration 76. Once again there is a groove 78 in which the holding element can engage with a tongue for fixing purposes.

FIG. 8 shows the side plate of FIG. 7 with inserted holding element 81, more specifically a) as a front view, b) as a plan view, c) as a section F-F as shown in Figure a) and d) as an isometric view. It will be seen that the foot portion 82 of the holding element 81 is fitted into the recess 75 (FIG. 7) and is prevented from falling out upwardly by the latching springs 77 and forwardly by the tongue engaging into the groove 78 (FIG. 7).

Figure 9:
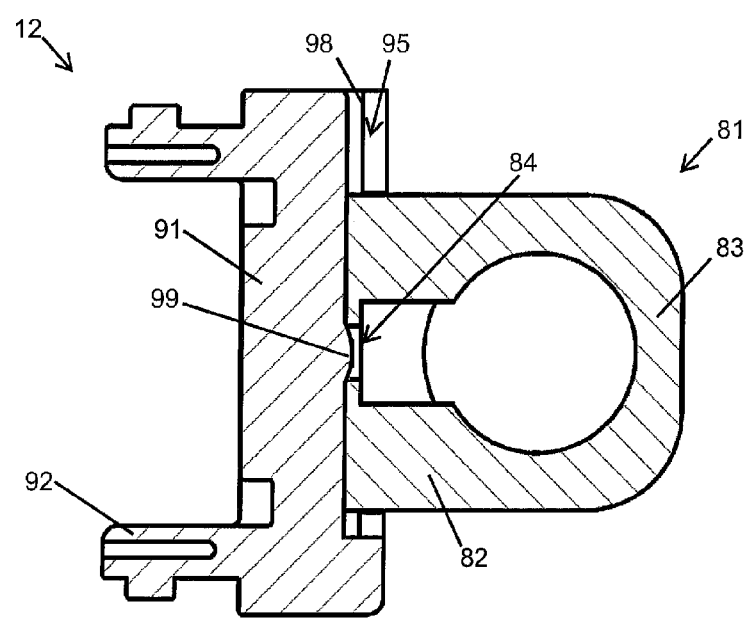
FIG. 9 shows a side plate with receiving means shaped thereon according to a fourth embodiment of the invention.

FIG. 9 shows a preferred embodiment of an external side plate 12 as a central cross-sectional view. The side plate 12 has a receiving means which is integrally produced with the body 91 of the side plate 12, for example in an injection moulding process, for the holding element 81. In comparison with FIGS. 7 and 8 the receiving means additionally has a centring projection 99 in the form of a nose. The centring projection 99 is in the shape of a spherical cap portion or dome and forms a slightly raised portion on which a through bore 84 of the holding element 81 can be centred and latchingly engage upon insertion of the holding element. The radius of the centring projection 99 is selected for through bores 84 of about 4 to 10 mm, in particular 6 to 8 mm, in diameter. For easier fitment of the holding element 81 the centring projection 99 can have an inclined run-on surface (not shown) which falls away towards the insertion funnel configuration. By virtue of the centring projection 99 it is possible to provide a recess 95 which is larger in height and width for fixing different sizes of holding elements 81 without a simple central fixing on the neutral fibre being adversely affected thereby. The holding element 81 can thus be suitably selected for differing diameters of a corrugated tube to be mounted thereto, that is to say a side plate 12 can receive different holding elements 81. Other features of the side plate 12, in particular the receiving means, are identical to those in FIGS. 7 and 8, and this also applies to the holding element 81.

LIST OF REFERENCES

FIGS. 1-2
  1 energy guiding chain
  2 upper run
  3 lower run
  4 direction-changing region
  5, 6 end fixing portion
  7 chain link
  11 internal side plate
  12 external side plate
  13 transverse limb
  14 longitudinal direction of the chain
FIGS. 3-4
  30 body of the receiving element
  31 recess
  32 insertion funnel configuration
  33 angled region
  34 latching projection
  35 latching spring
  36 groove
  40 body of the side plate
  42 pin for transverse limb
  41 latching projection for transverse limb
  43 pivot sleeve
  44 receiving element
  46 holding element
  47 foot portion of the holding element 72
  48 ring portion of the holding element
  49 tongue of the foot portion
FIGS. 5-6
  30 body of the receiving element
  31 recess 32 insertion funnel configuration
33 angled region
34 latching projection
35 latching spring
36 groove
40 body of the side plate
42 pin for transverse limb
41 latching projection for transverse limb
43 pivot sleeve
44 receiving element
46 holding element
47 foot portion of the holding element 72
48 ring portion of the holding element
49 tongue of the foot portion
51 central latching projection
52 recess in the narrow side of the side plate
FIGS. 7-8
71 body of the side plate
72 pin for transverse limb with latching projection
73 pivot sleeves
75 recess
76 insertion funnel configuration
77 latching spring
78 groove
81 holding element
82 foot portion of the holding element
83 ring portion of the holding element
FIG. 9
12 external side plate
91 body of the side plate
92 pin for transverse limb with latching projection
95 recess
98 groove
99 centring projection
81 holding element
82 foot portion of the holding element
83 ring portion of the holding element
84 through bore

What is claimed is:

1. An energy guiding chain for guiding lines, comprising:
a plurality of hingedly interconnected chain links of which at least a portion have mutually parallel side plates and transverse limbs connecting the side plates, the energy guiding chain having a longitudinal direction and the side plates each having an inside surface and an outside surface,
wherein adjacent chain links of the plurality of chain links are pivotable relative to each other about a respective pivot axis extending transversely relative to the longitudinal direction of the energy guiding chain,
wherein a plurality of lines are guidable in the energy guiding chain in the longitudinal direction within the chain links while at least one further line is arrangeable outside the chain links and is supportable by holding elements of the energy guiding chain,
wherein a receiving means is provided at at least one side of the energy guiding chain and on the outside surfaces at at least some of the side plates in a region between two respective pivot axes of the at least some of the side plates,
wherein the holding elements for the at least one further line are insertable in the receiving means along a plane extending parallel to the side plate, and
wherein the receiving means are provided on each of the at least some of the side plates centrally with respect to a direction which runs transversely to the longitudinal direction of the energy guiding chain and transversely to the respective pivot axes.

2. The energy guiding chain according to claim 1, wherein each of the receiving means are integral with the side plate.

3. The energy guiding chain according to claim 2, wherein the energy guiding chain has internal side plates and external side plates, wherein the internal side plates and the external side plates are arranged to alternate in the longitudinal direction of the energy guiding chain, and wherein each of the receiving means are integral with at least some of the external side plates.

4. The energy guiding chain according to claim 1, wherein each of the receiving means is provided in a receiving element that is separate from the side plates and is fixable to an outside of a respective one of the at least some of the side plates.

5. The energy guiding chain according to claim 4, wherein the receiving element is fixable by elastically deformable latching hooks which embrace an upper narrow side and a lower narrow side of the respective side plates.

6. The energy guiding chain according to claim 5, wherein the respective one of the at least some of the side plates has at least one transverse limb connected thereto, the transverse limb having two opposite front sides, and wherein the latching hooks bear are bearable against the opposite front sides of the transverse limb such that the receiving element is fixable in the longitudinal direction of the chain.

7. The energy guiding chain according to claim 5, wherein the respective one of the at least some of the side plates has two narrow sides, each with a recess therein, and the receiving element has further latching projections, each of which is latchable in one of the recesses in the narrow sides.

8. The energy guiding chain according to claim 2, wherein each of the receiving means comprise a recess, provided on the outside surface of a respective side plate, the recess having two longitudinal sides oriented in a height direction transverse to the longitudinal direction of the energy guiding chain along which the holding element is insertable, the recess being open towards at least one side of the height direction.

9. The energy guiding chain according to claim 8, wherein inside surfaces of the two longitudinal sides of each of the recesses are profiled such that a counterpart profile of the holding element, when fitted into the recess, cooperates with the profiled inside surfaces of the recess to fix the holding element in a direction perpendicular to the side plate.

10. The energy guiding chain according to claim 1, wherein a flexible tube is supportable by the holding elements, and the at least one further line arrangeable outside the chain links and supportable by the holding elements is accomodatable in the flexible tube.

11. The energy guiding chain according to claim 8, wherein provided in the recess is a centering projection which cooperates with the holding element.

12. The energy guiding chain according to claim 1, wherein the receiving means are provided at only one side of the energy guiding chain.

13. A side plate for an energy guiding chain, the side plate comprising:
a body with an inside surface and an outside surface,
the side plate configured to be pivotally connectable to two adjacent side plates of the energy guiding chain,
the side plate defining two respective pivot axes about which the two adjacent side plates of the energy guiding chain, when connected thereto, are pivotable relative to each other, the two pivot axes being spaced apart in a longitudinal direction of the side plate and extending transversely relative to the longitudinal direction, the body having on the outside surface a central region between the two pivot axes, and wherein a receiving means is provided integrally with the body of the side plate at the outside surface and in the central region, the receiving means being configured to receive a holding element that is insertable along a plane extending parallel to the outside surface of the side plate.

14. The side plate according to claim 13, wherein the receiving means comprises a recess that has longitudinal sides with profiled inside surfaces, and wherein the inside surfaces are profiled such that a counterpart profile of the holding element, when fitted into the recess, cooperates with the profiled inside surfaces of the recess to fix the holding element in a direction perpendicular to the outside surface of the side plate.

15. The side plate according to claim 14, wherein provided in the recess is a centering projection configured to cooperate with a holding element when inserted into the receiving means.

16. The side plate according to claim 13, further comprising a holding element that is inserted into the receiving means and configured to support a hose or a flexible tube.

17. A side plate for an energy guiding chain, the side plate comprising:

a body with an inside surface and an outside surface, the side plate configured to be pivotally connectable to two adjacent side plates of the energy guiding chain, the side plate defining two respective pivot axes about which the two adjacent side plates of the energy guiding chain, when connected thereto, are pivotable relative to each other, the two pivot axes being spaced apart in a longitudinal direction of the side plate and extending transversely relative to the longitudinal direction, the body having on the outside surface a central region between the two pivot axes, and wherein a receiving element that is separate from the side plate is fixable to the outside surface and in the central region between the two pivot axes, the receiving element configured to hold a holding element to support a hose.

* * * * *